3,032,556
PROCESS FOR THE PREPARATION OF NEW
TROPANE DERIVATIVES
Ernst Jucker, Binningen, Basel-Land, and Anton Ebnöther, Basel, Switzerland, assignors to Sandoz A.G., Basel, Switzerland, a Swiss firm
No Drawing. Filed Nov. 9, 1959, Ser. No. 851,503
Claims priority, application Switzerland Nov. 26, 1958
15 Claims. (Cl. 260—292)

The present invention relates to new tropane derivatives and a process for their production.

The present invention provides tropane derivatives and acid addition salts thereof, said tropane derivatives having the general Formula I,

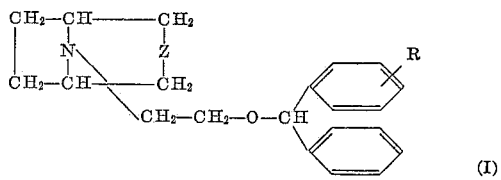
(I)

wherein R is selected from the class consisting of hydrogen atoms, halogen atoms, alkyl and alkoxy groups each containing 1–6 carbon atoms and the trihalogenomethyl group, and Z is selected from the class consisting of keto, oxime, secondary alcohol, esterified secondary alcohol and etherified secondary alcohol groups.

The compounds of Formula I above may be produced, according to the invention, by condensation procedures using two or more compounds to give the required tropane or tropine derivative and these procedures will be described hereinafter.

In accordance with one method of carrying out the process of the present invention, some of the compounds under the Formula I above may be produced.

(1) By condensing an N-(2'-hydroxyethyl)-nortropane-3-one having the Formula II,

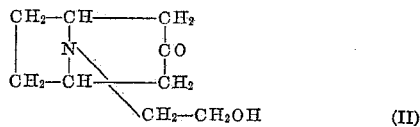
(II)

with a diphenylmethane derivative having the general Formula III,

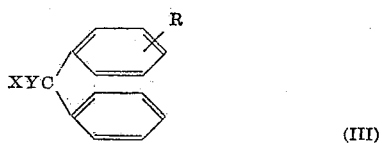
(III)

wherein R has the significance as in Formula I, X is hydrogen, and Y is a halogen atom, or XY is N₂, to produce a derivative of the general Formula IV,

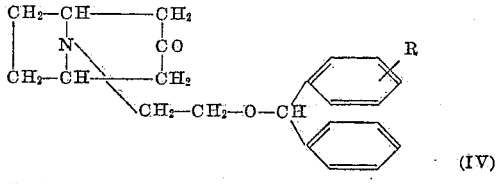
(IV)

wherein R has the above significance, or (2) By condensing a 2'-halogenethyl-benzhydryl ether having the general Formula VI,

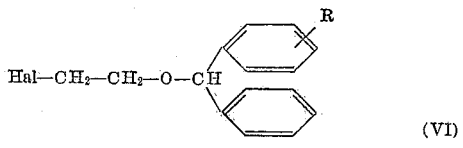
(VI)

wherein Hal is chlorine or bromine, with nortropane-3-one having the Formula V,

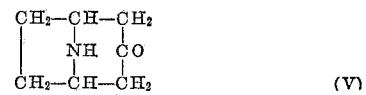
(V)

to give a tropane-3-one derivative having the above Formula IV, or (3) By condensing acetonedicarboxylic acid, succindialdehyde and a primary amine having the general Formula VII,

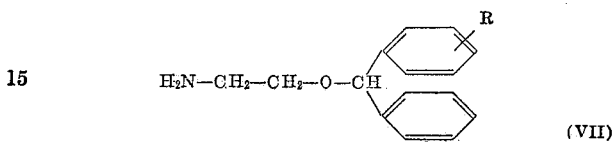
(VII)

wherein R has the above significance.

It should be noted that, in accordance with the invention also, any keto group in the end products of Formula IV above may be converted to an oxime or reduced to give a secondary alcohol group which may furthermore be etherified or esterified.

In accordance with a second method of carrying out the process of the present invention it is possible to condense a 3-hydroxy-nortropane having the Formula VIII,

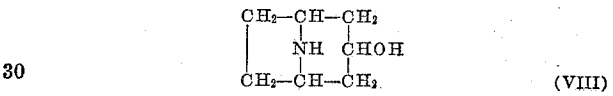
(VIII)

with a 2'-halogenoethyl-benzhydryl ether having the above Formula VI, directly to give the end product having the Formula I above, it being understood that in this case the symbol Z is a secondary alcohol group which may thereafter be acylated or etherified.

In accordance with a third method of carrying out the process of the present invention the end product having the Formula I above may be obtained by reacting an N-(2'-hydroxyethyl)-3 - hydroxy - nortropane having the Formula IX,

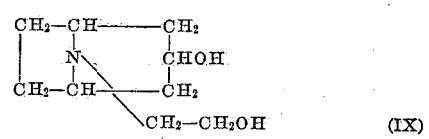
(IX)

with a diphenyl methane derivative having the above Formula III in which case both hydroxy groups are etherified simultaneously.

One specific method of carrying out the present invention to illustrate the ease of preparation of the new compounds may be effected as follows:

N-(2'-hydroxyethyl)-nortropane-3-one is condensed during several hours at an elevated temperature and in an atmosphere of nitrogen with diphenyl-bromomethane, the condensation being effected in the presence of an agent capable of taking up hydrogen halides, for example, anhydrous sodium carbonate. The condensation products having the Formula IV above may then be isolated from the reaction mixture using known methods (by "known" methods there are meant methods which are in actual use or described in the literature on the subject), and, if desired, may be purified by recrystallization after conversion into a salt and/or into the oxime.

In accordance with another method of carrying out the process of the invention acetone-dicarboxylic acid, a primary amine of the general Formula VII above and succindialdehyde (produced by the hydrolysis of 2,5-diethoxy-tetrahydrofuran with 0.1 N hydrochloric acid) are mixed in the presence of sodium acetate in aqueous solution and the resulting mixture, after the pH value has been adjusted to approximately 4 and ethanol has been added, is left to stand for 2–3 days at room temperature, whereby the reaction proceeds with the evolution of carbon dioxide. After removing the ethanol in a vacuum, the aqueous solution is made alkaline and extracted with chloroform. After evaporation of the chloroform the required reaction product having the general Formula IV above is isolataed from the reaction mixture; the said product is purified and, when a salt is required, converted into its salt.

Reduction of the compounds having the Formula IV may be effected for example by catalytic hydrogenation at atmospheric or superatmospheric pressure and at atmospheric room or elevated temperature with sodium in an alkanol (e.g. ethanol), or by treatment with lithium aluminum hydride. Catalytic hydrogenation gives $3\alpha$-hydroxy-tropanes, reduction with sodium and an alkanol gives rise to $3\beta$-hydroxy-tropanes (pseudotropine-derivatives).

The product resulting by reduction may be reacted with an acylating agent, for example, acetic anhydride, or it may be etherified with an alkyl or aralkyl halide, for example, diphenyl bromomethane or methyl bromide.

Another method of obtaining some of the compounds of the Formula I above in accordance with the invention consists in heating 3-hydroxy-nortropane in the presence of an agent capable of taking up hydrogen halide (anhydrous sodium carbonate) with a 2'-halogeno-ethyl-benzhydryl ether having the Formula VI above and, if desired, esterifying or etherifying the resulting product as already mentioned above to make the corresponding ester (acetate) or ether (diphenyl methyl ether) or methyl ether of said nortropane condensation product.

A further variant of a method for the production of certain tropane derivatives under Formula I in accordance with the invention consists in etherifying simultaneously both hydroxy groups of the N-(2'-hydroxyethyl)-3-hydroxy-nortropane with a diphenyl methane derivative, for example p-chloro-benzhydryl chloride in the presence of an agent capable of taking up hydrogen halide at an elevated temperature, e.g. anhydrous sodium carbonate.

The tropane derivatives of the present invention are basic compounds which form salts with inorganic or organic acids. These salts are included in the scope of the present invention; they form stable and crystalline solids at room temperature. Examples of such acids are: hydrochloric, hydrobromic, sulphuric, citric, oxalic, tartaric, succinic, maleic, acetic, benzoic, hexahydrobenzoic, and methanesulphonic acid.

The exemplified compounds have therapeutically valuable pharmacodynamic properties, are endowed with a low toxicity, exhibit an acetylcholine inhibiting effect (atropine-like effect), and also exhibit a remarkable histamine inhibiting effect. Of importance is the prolonged antihistamine effect demonstrated by the exemplified compounds which is unexpectedly better than that of a large number of commercially valuable antihistamines. The exemplified compounds are therefore useful in therapy as long-acting antihistamines. Furthermore, by quaternizing the exemplified compounds, e.g. by treatment with alkyl halides, medicinal substances are obtained which are antihistamines or acetylcholine inhibitors due to the characteristic groupings attached to the nitrogen atom of the tropane derivatives.

The following examples illustrate the process and products of the present invention. These examples are not intended to be limited but are merely illustrative and show all temperatures in degrees centigrade; when only salts are indicated, the free bases are liberated by making alkaline a solution of the salts.

EXAMPLE I

*N-(2'-Benzhydryloxy-Ethyl)-Nortropane-3-one*

A mixture of 8.5 g. of N-(2'-hydroxylethyl)-nortropane-3-one and 5.5 g. of anhydrous sodium carbonate is mixed with stirring at a temperature of 60° with a solution of 12.4 g. of diphenyl-bromomethane in 5 cc. of benzene, the benzene solution being added dropwise. Thereupon the material is heated while stirring constantly for 6 hours to a temperature of 120° in an atmosphere of nitrogen, the reaction mixture is mixed with 50 cc. of benzene after cooling and inorganic salts which have precipitated out are filtered off. The benzene layer is shaken out three times each time with 15 cc. of 2 N hydrochloric acid solution, whereby the hydrochloride which is not easily soluble in water precipitates out in the form of an oil. This oil and the aqueous phase are freed from benzene. The aqueous phase together with the oily hydrochloride is made alkaline with saturated potassium carbonate solution. The resulting precipitated oily base is taken up in benzene, the benzene solution is dried over magnesium sulphate and evaporated. The remaining oil is dissolved in 25 cc. of methanol and aqueous hydrogen bromide solution is added until the solution just shows a weak acid reaction with Congo red indicator. The liquid is then evaporated to dryness and the resulting foamy residue is dissolved in isopropanol. On standing N-(2'-benzhydryloxy-ethyl)-nortropane-3-one hydrobromide crystallizes out. This material melts after recrystallization twice from isopropanol at a temperature of 155 to 156° (decomposition).

EXAMPLE II

*N-(2'-Benzhydryloxy-Ethyl)-Nortropane-3-one*

1.30 g. of nortropane-3-one, 2.91 g. of 2'-bromoethyl-benzhydryl ether and 640 mg. of anhydrous sodium carbonate in 20 cc. of ethanol are heated for 5 hours in an atmosphere of nitrogen while stirring. An additional 640 mg. of sodium carbonate are added and heating is effected for a further 15 hours. After cooling and filtering off inorganic salts, the ethanol is evaporated in a vacuum and the residue is taken up in benzene and dried. The further procedure for heating the residual oil after benzene evaporation with HBr in methanol is then effected as in Example I. The end product, N-(2'-benzhydryloxy-ethyl)-nortropane-3-one hydrobromide, melts after recrystallizing twice from isopropanol at 155 to 156° (decomposition). The mixed melting point with the N-(2'-benzhydryloxy-ethyl)-nortropane-3-one hydrobromide produced as in Example I shows no depression.

EXAMPLE III

*N-(2'-Benzhydryloxy-Ethyl)-Nortropane-3-one Oxime*

5 g. of N-(2'-benzhydryloxy-ethyl)-nortropane-3-one hydrobromide, 1.55 g. of hydroxylamine hydrochloride and 25 cc. of methanol are added to a solution of 7.5 g. of potassium hydroxide in 12.5 cc. of water and the resulting material is shaken while heating gently until the N-(2'-benzhydryloxy-ethyl)-nortropane-3-one which is a viscous substance has gone into solution. The material is then left to stand for 20 hours at room temperature, carbon dioxide is introduced into the material until the solution has a pH value of 8 to 9. The viscous precipitate which results is taken up in benzene. The benzene solution after drying over sodium sulphate is evaporated, the residue is dissolved in methanol, the solution is neutralized with an aqueous solution of hydrogen bromide, whereby a crystalline deposit of N-(2'-benzhydryloxy-ethyl)-nortropane-3-one oxime hydrobromide falls out. The last mentioned material is recrystallized twice from methanol and has a melting point of 213 to 214° (decomposition).

EXAMPLE IV

*N-(2'-Benzhydryloxy-Ethyl)-Nortropine*

A solution of 10.6 g. of N-(2'-benzhydryloxy-ethyl)-nortropane-3-one hydrobromide (produced in accordance with Example I or Example II) in 100 cc. of methanol is shaken at room temperature at atmospheric pressure with 0.5 g. of platinum oxide and hydrogen. After 1.3 mols of hydrogen have been taken up, the catalyst is filtered off and the solution is evaporated in a vacuum. The residue is taken up in acetone whereby crude N-(2'-benzhydryloxy-ethyl)-nortropine hydrobromide crystallizes out. The last mentioned material after crystallizing three times from a mixture of methanol and acetone melts at 172 to 173° (decomposition).

EXAMPLE V

N-(2'-Benzhydryloxy-Ethyl)-Nortropine 1.33 g. of nortropine, 2.91 g. of 2'-bromoethyl-benzhydryl-ether and 640 mg. of dry sodium carbonate in 20 cc. of ethanol are heated for 5 hours while stirring, a further 640 mg. of sodium carbonate are added and heating for 15 hours is continued. The resulting precipitate is filtered off, the filtrate is evaporated in a vacuum and the resulting oil residue is rubbed with 20 cc. of 2 N aqueous hydrogen bromide solution. N-(2'-benzhydryloxy-ethyl)-nortropine hydrobromide precipitates in crystalline form and is filtered off, boiled with acetone and recrystallized from a little methanol-acetone. Melting point 173–174° (decomposition). When mixed with the end product obtained in accordance with Example IV there is no depression of the melting point.

EXAMPLE VI

N-(2'-Benzhydryloxy-Ethyl)-3α-Acetoxy-Nortropane 3 g. of N-(2'-benzhydryloxy-ethyl)-nortropine hydrobromide (produced in accordance with Example IV or V) are heated in 15 cc. of acetic acid anhydride for 4 hours to 100°, whereby the compound dissolves slowly. On cooling N-2'-benzhydryloxy-ethyl)-3α-acetoxy - nortropane hydrobromide crystallizes out. Melting point after recrystallization from acetone 185 to 186° (decomposition).

EXAMPLE VII

N-(2'-Benzhydryloxy-Ethyl)-3-Benzhydryloxy-Nortropane

A mixture of 4.0 g. of N-(2'-benzhydryloxy-ethyl)-nortropane (produced in accordance with Examples IV or V) and 1.3 g. of anhydrous sodium carbonate are mixed with a solution of 3 g. of diphenyl bromomethane in 3 cc. of benzene, at 60° while stirring, the mixing being effected by adding the benezene solution dropwise, and the resulting mixture is then heated to 120°, whereby the benzene evaporates. The cool reaction mixture is stirred with 15 cc. of benzene, the inorganic salts which have precipitated out are filtered off, the filtrate is evaporated and the residue is subjected to chromatography on a column of 250 g. of aluminum oxide. The portion which is eluted with benzene is dissolved in methanol and neutralized with aqueous hydrobromic acid solution. After evaporating the solution in a vacuum, the residue is dissolved in a small amount of chloroform and is precipitated by slowly adding a small volume of diethyl ether. In this way N-(2'-benzhydryloxy-ethyl)-3α-benzhydryloxy-nortropane hydrobromide crystallizes out with chloroform as liquid of crystallization. The compound melts at approximately 80° with loss of the chloroform; after prolonged drying in a high vacuum at 80° the substance melts at 150 to 153° (decomposition).

EXAMPLE VIII

N-(2'-p-Chloro-Benzhydryloxy-Ethyl)-Nortropane-3-one

A mixture of 24 g. of 4-chloro-diphenyl-chloromethane in 5 cc. of benzene is added to a mixture of 17 g. of N-(2'-hydroxyethyl)-nortropane-3-one and 11 g. of anhydrous sodium carbonate at 60° while stirring, the addition being effected dropwise. Thereupon the reaction mixture is heated in an atmosphere of nitrogen to 120° for a further 8 hours. After cooling, 100 cc. of benzene are added and the inorganic salts which have precipitated out are filtered off. The filtrate is shaken out three times, each time with 20 cc. of 2 N hydrochloric acid solution. The hydrochloride which precipitates out as an oily material together with the aqueous phase is separated. The aqueous portion together with the oily hydrochloride is then made alkaline with a saturated potassium carbonate solution and the resulting oily base which precipitates out is taken up in benzene. After drying with magnesium sulphate the solution is evaporated in a vacuum and the remaining brown viscous oil is dissolved in 50 cc. of methanol, 46 cc. of 2 N aqueous hydrobromic acid solution are added and the resulting solution is evaporated in a vacuum to dryness. The resulting residue is dissolved in 100 cc. of isopropanol. On rubbing crystalline N-(2'-p-chlorobenzhydryloxy-ethyl) - nortropane-3-one hydrobromide results. The last mentioned material crystallizes on treatment with animal charcoal from isopropanol in colorless small crystalline aggregates having the melting point of 156 to 158° (decomposition).

EXAMPLE IX

N-(2'-p-Chlorobenzhydryloxy-Ethyl)-Nortropane-3-one Oxime

The oxime is produced in an analogous manner from N - (2'-p-chlorobenzhydryloxy-ethyl) - nortropane-3-one and hydroxylamine hydrochloride as in Example III. The oxime hydrobromide melts at 212 to 213° (decomposition).

EXAMPLE X

N-(2'-p-Chloro-Benzhydryloxy-Ethyl)-Nortropine 11.85 g. of p-chloro-diphenyl-chloromethane, 8.98 g. of ethylene bromohydrine and 5.12 g. of anhydrous sodium carbonate are heated for 8 hours while stirring to 120°. After the addition of 50 cc. of benzene, the precipitated inorganic salts are filtered off, the benzene solution is evaporated in a vacuum and the residue is distilled. The required 2'-bromoethyl-p-chloro-benzhydryl ether distills at 0.05 mm. of Hg and a temperature of 152 to 153°. 5.08 of 2'-bromoethyl-p-chlorobenzhydryl ether, 2.07 g. of nortropine and 1 g. of anhydrous sodium carbonate in 30 cc. of ethanol are heated for 4 hours while stirring thoroughly. Hereafter a further 1 g. of sodium carbonate and after a further 4 hours 2 g. of sodium carbonate are added, whereupon heating is continued for a further 15 hours. After cooling, the resulting inorganic salts are filtered off, the filtrate is evaporated. The residue is dissolved in benzene, a little inorganic material is filtered off and the solution is again evaporated. The solution of the residue in 20 cc. of methanol is neutralized with 2 N aqueous hydrobromic acid solution (approximately 8 cc. are required). The solution is then evaporated to dryness, the residue is dissolved in isopropanol and an equal amount of ether is added slowly, whereby N-(2'-p-chloro-benzhydryloxy-ethyl)-nortropine hydrobromide crystallizes out. The last mentioned material is recrystallized from ethanol and melts hereafter at 172 to 174° (decomposition).

EXAMPLE XI

N-(2'-p-Chloro-Benzhydryloxy-Ethyl)-Nortropine

A solution in 50 cc. of methanol of 2.8 g. of N-(2'-p-chlorobenzhydryloxy-ethyl)-nortropane-3-one hydrobromide (produced according to Example VIII) is shaken with Raney nickel and hydrogen at 40° at a pressure of 45 atmospheres for 5 hours. The catalyst is filtered off, the solution is evaporated to dryness and the residue is crystallized from isopropanol. After recrystallizing four times from ethanol the compound melts at 172 to 174° (decomposition). There is no depression of the melting point with N-(2'-p-chloro-benzhydryloxy-ethyl)-nortropine hydrobromide produced in accordance with Example X.

EXAMPLE XII

*N-(2'-p-Chloro-Benzhydryloxy-Ethyl)-3α-Acetoxy-Nortropane*

3 g. of N-(2'-p-chloro-benzhydryloxy-ethyl)-nortropine hydrobromide (produced in accordance with Examples X or XI) are heated with 15 cc. of acetic acid anhydride for 2 and a half hours to 100°. After cooling, 20 cc. of ether are added slowly, whereby N-(2'-p-chloro-benzhydryloxy-ethyl)-3α-acetoxy - nortropane hydrobromide crystallizes. The material is recrystallized from acetone and has a melting point of 156 to 158° (decomposition).

EXAMPLE XIII

*N(2'-p-Chloro-Benzhydryloxy-Ethyl)-3α-p-Chloro-Benzhydryloxy-Nortropane*

A solution of 10 g. N-(2'-hydroxyethyl)-nortropane-3-one is shaken with 200 mg. of platinum oxide and hydrogen at a pressure of 5 atmospheres. After the hydrogen absorption has ceased, the catalyst is filtered off and the solution is evaporated in a vacuum, whereby N-(2'-hydroxyethyl)-nortropine crystallizes out. The last mentioned material is recrystallized from ethyl acetate and has a melting point of 104 to 106°. The hydrobromide of N-(2'-hydroxyethyl)-nortropine melts after recrystallization from ethanol at 146 to 147° (decomposition).

5.75 g. of N-(2'-hydroxyethyl)-nortropine, 15.95 g. of p-chlorobenzhydryl chloride and 7.15 g. of anhydrous sodium carbonate are heated to 120° for 7 hours while stirring. The resulting reaction mixture is then taken up to 50 cc. of benzene, the resulting inorganic salts are filtered off and the filtrate is subjected to chromatography on a column of 400 g. of aluminum oxide. The first fractions which are eluted with 1300 cc. of benzene are dissolved in a mixture of methanol and acetone (1:1), neutralized with aqueous hydrobromic acid solution and evaporated. The foamy residue is dissolved in a little acetone and a large amount of ether is added slowly, whereby N-(2'-p-chloro-benzhydryloxy-ethyl)-3α-p-chloro-benzhydryloxy-nortropane hydrobromide crystallizes out. The last mentioned material melts after recrystallization from isopropanol at 185 to 186° (decomposition).

EXAMPLE XIV

*N-(2'-p-Methyl-Benzhydryloxy-Ethyl)-Nortropine*

26.2 g. of p-methyl-diphenyl-bromomethane, 15.6 g. of ethylene-bromohydrin and 10.6 g. of anhydrous sodium carbonate are heated to 120° while stirring for 8 hours. After cooling and the addition of 100 cc. of benzene the inorganic salts are filtered off, the benzene solution is evaporated in a vacuum and the residue is distilled. 2'-bromoethyl-p-methyl-benzhydryl ether distills at a pressure of 0.02 mm. of Hg at 148°.

2.6 g. of nortropine, 6.1 g. of 2'-bromoethyl-p-methyl-benzhydryl ether and 1.3 g. of anhydrous sodium carbonate are heated in 50 cc. of absolute ethanol for 4 hours to the boil at reflux while stirring. After the addition of 1.3 g. of sodium carbonate heating is continued for a further 4 hours, 2.5 g. of more sodium carbonate are added and heating to the boil at reflux is subsequently effected for a further 15 hours. The precipitate consisting of inorganic salt is filtered off, the filtrate is evaporated in a vacuum and the residue is dissolved in benzene. After filtering off small amounts of inorganic salts the solution is evaporated in a vacuum. The hard residue is subsequently dissolved in acetone and the solution is brought to a pH value of 6 by means of a solution of hydrogen chloride in ether. The solution is then evaporated to dryness in a vacuum and the residue is crystallized from isopropanol or a mixture of ethanol and ether. N - (2' - p - methylbenzhydryl - ethyl) - nortropine hydrochloride melts at 168 to 170°.

EXAMPLE XV

*N-(2'-Bromo-Benzhydryloxy-Ethyl)-Nortropine*

28.1 g. of p-bromo-diphenyl-chloromethane, 15.6 g. of ethylene-bromohydrin and 10.6 g. of anhydrous sodium carbonate are reacted as described in Example XIV. The resulting 2'-bromoethyl-p-bromobenzhydryl ether boils at a pressure of 0.02 mm. of Hg at 155–156°. The subsequent procedure is effected as in Example XIV by condensing 2.6 g. of nortropine and 7.4 g. of 2'-bromoethyl-p-bromobenzhydryl ether in 40 cc. of absolute ethanol and in the presence of anhydrous sodium carbonate; the resulting N-(2'-p-bromobenzhydryloxy - ethyl)-nortropine is converted into the hydrochloride by means of a solution of hydrogen chloride in ether. After recrystallization from a mixture of ethanol and ether the melting point is 168 to 170°. The compound crystallizes extremely slowly.

EXAMPLE XVI

*N-(2'-o-Chloro-Benzhydryloxy-Ethyl)-Nortropine*

23.7 g. of o-chloro-diphenyl-chloromethane, 15.6 g. of ethylene-bromohydrin and 10.6 g. of anhydrous sodium carbonate are reacted in a manner analogous to that of Example XIV. 2'-bromoethyl-o-chloro-benzhydryl ether has a melting point of 148°/0.1 mm. of Hg.

By condensing 2.6 g. of nortropine and 6.5 g. of 2'-bromoethyl-o-chloro-benzhydryl ether in 40 cc. of absolute ethanol in the presence of anhydrous sodium carbonate as described in Example XIV there is obtained N - (2' - o - chloro - benzhydryloxy - ethyl) - nortropine; the last mentioned material is converted into its hydrochloride by means of hydrogen chloride in ether and the resulting material is crystallized from a mixture of isopropanol and ether with 1 mol of water of crystallization. The substance sinters at 135°, melts at approximately 144 to 149°, then solidifies to a large extent and then melts again at approximately 170 to 172°.

EXAMPLE XVII

*N-(2'-p-Methoxy-Benzhydryloxy-Ethyl)-Nortropine*

23.3 g. of p-methoxy-diphenyl-chloromethane, 15.6 g. of ethylene-bromohydrin and 10.6 g. of anhydrous sodium carbonate are heated to 120° for 4 hours while stirring. After adding 100 cc. of benzene, inorganic salts are filtered off, the benzene solution is evaporated in a vacuum and the residue, 2'-bromoethyl-p-methoxy-benzhydryl ether, is crystallized from hexane; melting point 65 to 66°.

From 2.6 g. of nortropine and 6.5 g. of 2'-bromo-ethyl-p-methoxy-benzhydryl ether in the presence of anhydrous sodium carbonate there is obtained, in a manner analogous to that of Example XIV, N-(2'-p-methoxy-benzhydryloxy-ethyl)-nortropine which has a melting point of 151 to 153° (decomposition) after conversion to the hydrobromide with aqueous hydrobromic acid and crystallizing from isopropanol.

EXAMPLE XVIII

*N-(2'-p-Trifluoromethyl-Benzhydryloxy-Ethyl)-Nortropine*

A solution of 20 g. of p-trifluoromethyl-benzophenone in 700 cc. of methanol is shaken with hydrogen and Raney nickel for 5 hours at 35° and a pressure of 30 atmospheres. The catalyst is then filtered off, the solution is evaporated and the residue is distilled. p-Trifluoromethyl-benzhydrol distills at a pressure of 0.1 mm. of Hg at 115 to 122° and crystallizes in the receptacle. Melting point 54 to 55° after crystallization from petroleum ether.

A solution of 15 g. p-trifluoromethyl-benzhydrol in 25 cc. of absolute toluene is mixed with 7.5 g. of thionyl chloride by adding it dropwise at approximately 25°.

Subsequently the material is brought to the boil at reflux for 6 hours, the solvent is then distilled off and the residue is distilled in a high vacuum. p-Trifluoromethyl-benzhydryl chloride distills at a pressure of 0.02 mm. of Hg at 89° as a colorless oil.

2'-bromoethyl-p-trifluoromethyl-benzhydryl ether having the boiling point of 120–124°/0.02 mm. of Hg is produced from 27.1 g. p-trifluoro-diphenyl-chloromethane, 15.6 g. of ethylene-bromohydrin and 10.6 g. of anhydrous sodium carbonate in a manner analogous to that of Example XIV. By condensing 2.6 g. of nortropine and 7.2 g. of 2'-bromoethyl-p-trifluoromethyl-benzhydryl ether in 50 cc. of absolute ethanol in the presence of anhydrous sodium carbonate the procedure described in Example XIV is continued; the resulting N-(2'-p-trifluoromethyl-benzhydryloxy-ethyl)-nortropine is converted into its hydrochloride by means of hydrogen chloride solution in ether. The material has a melting point of 136 to 139° and is present in the form of very fine needles after crystallization from a mixture of acetone and ether. The corresponding hydrobromide after crystallization from water melts at 171 to 173°.

EXAMPLE XIX

*N-(2'-p-Methyl-Benzhydryloxy-Ethyl)-Nortropane-3-one*

A mixture of 8.5 g. of N-(2'-hydroxyethyl)-nortropane-3-one and 5.5 g. of anhydrous sodium carbonate is mixed dropwise while stirring at 60° with 13.1 g. of p-methyl-diphenyl-bromomethane. Heating while stirring constantly in an atmosphere of nitrogen is effected to 90° for 1 hour and then to 120° for 6 hours. After cooling, the reaction mixture is mixed with 50 cc. of benzene and inorganic salts are filtered off. The filtrate is shaken three times, each time with 10 cc. of 2 N hydrochloric acid solution whereby the hydrochloride which is sparingly soluble in water, precipitates out in the form of an oil. This material is separated from benzene together with the aqueous phase. The aqueous phase and the oily hydrochloride together are made alkaline with a saturated solution of potassium carbonate. The precipitated oily phase is taken up in benzene, the benzene solution is dried over magnesium sulphate and evaporated. The oily residue is dissolved in acetone and hydrogen chloride solution in ether is added until the mixture is neutral. After the addition of ether the N-(2'-p-methyl-benzhydryloxy - ethyl)-nortropane-3-one hydrochloride crystallizes out. This material is recrystallized twice from acetone/ether and then has a melting point of 162 to 163° (decomposition).

EXAMPLE XX

*N-(2'-p-Methyl-Benzhydryloxy-Ethyl)-Nortropine*

A solution of 4 g. of N-(2'-p-methyl-benzhydryloxy-ethyl)-nortropane-3-one hydrochloride (produced as in Example XIX) in 100 cc. of methanol is shaken with Raney nickel and hydrogen for 4 hours at a temperature of 40° and a pressure of 45 atmospheres. After completion of the hydrogen absorption the material is filtered free from the catalyst and the solution is evaporated in a vacuum. The residue is crystallized twice from a mixture of ethanol and ether. N-(2'-p-methyl-benzhydryloxy-ethyl)-nortropine hydrochloride melts at 168° to 170°.

EXAMPLE XXI

*N-(2'-p-Chlorobenzhydryloxy-Ethyl)-Norpseudotropine*

A suspension of 250 mg. of lithium aluminum hydride and 10 cc. of ether is added dropwise at 0–5° while stirring to a solution of 4 g. of N-(2'-p-chlorobenzhydryloxy-ethyl)-nortropane-3-one (produced according to Example VIII) in 20 cc. of benzene and 20 cc. of ether. After stirring for 3 hours at room temperature, 2 cc. of a saturated sodium sulphate solution is added dropwise and slowly while cooling thoroughly. The resulting precipitate is then filtered off and boiled three times with benzene. The united filtrates are evaporated thereafter. The oily residue is dissolved in methanol, the solution is made acid with ethereal hydrogen chloride and again evaporated. The residue crystallizes from a mixture of acetone and ether. After recrystallizing several times from ethanol the resulting N-(2'-p-chlorobenzhydryloxy - ethyl)-norpseudotropine hydrochloride melts at 190 to 193° (decomposition) after first sintering above 186°.

EXAMPLE XXII

*N-(2-Benzhydryloxy-Ethyl)-Nortropane-3-one*

Diphenyldiazomethane (produced from 7.5 g. of benzophenone-hydrazone and 8.5 g. of mercuric oxide) and a solution of 3.4 g. of N-(2'-hydroxyethyl)-nortropane-3-one in 5 cc. of absolute benzene are heated to 80–85° at reflux for 3 hours. After cooling the reaction mixture is mixed with 50 cc. of benzene and 600 cc. of an aqueous ice cooled 0.5% solution of hydrochloric acid, whereby the hydrochloride, which is sparingly soluble in water, precipitates as an oil. After separation of the benzene layer, the aqueous portion together with the oily hydrochloride is made alkaline with a saturated potassium carbonate solution in water. The precipitated oily base is then taken up in benzene, the benzene solution is dried over magnesium sulphate and evaporated. The oily residue is dissolved in methanol and the pH value of the solution is brought to 5 by means of aqueous hydrogen bromide solution. The material is evaporated to dryness and the residue is crystallized from isopropanol. After several recrystallizations from isopropanol N-(2'-benzhydryloxy-ethyl)-nortropane-3-one hydrobromide melts at 155 to 156° (decomposition).

EXAMPLE XXIII

*N-(2'-Benzhydryloxy-Ethyl)-Nortropane-3-one*

A solution of succindialdehyde (produced by the hydrolysis of 1.6 g. of 2,5-diethoxy-tetrahydrofuran with 30 cc. of 0.1 N hydrochloric acid) is added to a solution of 6 g. of sodium acetate, 3 g. of acetonedicarboxylic acid and 2.64 g. of 2-benzhydryloxy-ethylamine hydrochloride in 150 cc. of water. After adjusting the pH value of the solution to 4 and adding 75 cc. of ethanol, the material is left to stand for 3 days at ambient temperature. Thereafter the ethanol is distilled off in a vacuum, the solution is made alkaline and three extractions with chloroform are effected. After drying of the chloroform extract over magnesium sulfate and evaporating the chloroform, the residue is dissolved in methanol and the resulting solution is made acid with aqueous hydrobromic acid solution. Subsequently the solution is evaporated to dryness in a vacuum. The residue is crystallized from isopropanol giving N - (2' - benzhydryloxy-ethyl)-nortropane-3-one hydrobromide which, after recrystallizing twice from isopropanol, melts at 155 to 156° (decomposition).

EXAMPLE XXIV

*N-(2'-p-Chloro-Benzhydryloxy-Ethyl)-Nortropane-3-one*

As described in Example XXIII, using the same method, there is obtained N-(2'-p-chloro-benzhydryloxy-ethyl)-nortropane-3-one from 6 g. of sodium acetate, 3 g. of 2 - (p - chloro-benzhydryloxy)-ethylamine hydrochloride, 3 g. of acetonedicarboxylic acid and a solution of succindialdehyde (produced by the hydrolysis of 1.6 g. of 2,5-diethoxy-tetrahydrofuran with 30 cc. of 1 N hydrochloric acid); the tropane derivative is converted into its hydrobromide by means of aqueous hydrogen bromide solution. After crystallization from isopropanol the hydrobromide melts at 156 to 158° (decomposition).

The 2-(p-chlorobenzhydryloxy)-ethylamine hydrochloride which is used as starting material is produced as follows:

11.85 g. of p-chloro-diphenyl-chloromethane, 8.98 g. of ethylene-bromohydrin and 5.12 g. of anhydrous sodium carbonate are heated to 120° for 8 hours while stirring. After adding 50 cc. of benzene, the precipitated inorganic salts are filtered off, the benzene solution is evaporated in a vacuum and the residue is distilled. 2-bromoethyl-p-chlorobenzhydryl ether distills at a pressure of 0.05 mm. of Hg at 152 to 153°.

4 bomb tubes, each containing 5 g. of 2-bromoethyl-p-chlorobenzhydryl ether, 2 g. of sodium carbonate, 25 cc. of absolute ethanol and 10 cc. of liquid ammonia, are heated for 4 days to 50°. The inorganic salts are removed by filtering and the solution is evaporated in a vacuum. Subsequently the residue is dissolved in diluted hydrochloric acid and extracted with ether. The aqueous phase is then made strongly alkaline and extracted three times with ether. After drying the ethereal solution over potassium carbonate, the solution is evaporated. The residue is then distilled whereby 2-(p-chlorobenzhydryloxy)-ethylamine distills at a pressure of 0.06 mm. of Hg and a temperature of 153 to 154°. $n_D^{20}=1.5783$. The hydrochloride, after crystallization from a mixture of ethanol and ether melts at 147 to 149°.

In the foregoing examples the 2'-halogenoethylbenzhydryl ether having the general Formula VI is shown for reactants in which R is halogen (see Example VIII) and in which R is alkyl (see Example XIV). R in Formula VI and in Formula VII may be an alkyl group up to 6 carbon atoms in lieu of a methyl group which is shown in Example XIX or may be an alkoxy group containing up to 6 carbon atoms such as ethoxy, butoxy, etc., these substituents being either in the ortho, meta or in the para position to the methyl group attached to the two benzene rings of the diphenyl halomethane reactant. The exemplification of N-(2'-benzhydryloxy-ethyl)-nortropane-3-one oxime is merely illustrative of one of these alkoxy derivatives in accordance with the invention.

The reduction of the 3 keto group illustrated with N-(2'-hydroxyethyl)-nortropane-3-one in Example XIII using platinum oxide and hydrogen at a pressure of 5 atmospheres may be carried out with other catalysts such as palladium oxide, Raney nickel, etc., at superatmospheric pressure and at room temperature or elevated temperature. After reduction, the secondary hydroxyl group which is esterified may be acylated with lower acyl, e.g. with acetic acid (chloride or anhydride), butyric acid etc., or may be etherified with an alkylating agent having up to 4 carbon atoms in the alkyl group, e.g. with methyl bromide, ethyl bromide etc. or with aralkylating agents, e.g. diphenyl bromomethane, 4-methyl diphenyl chloromethane, diphenyl diazomethane etc.

Although the present invention is described herein with particular reference to specific details, it is not intended that such details shall be regarded as limitations upon the scope of the invention except insofar as included in the accompanying claims.

What is claimed is:

1. A member of the class consisting of tropane derivatives and acid addition salts thereof, said tropane derivatives having the formula

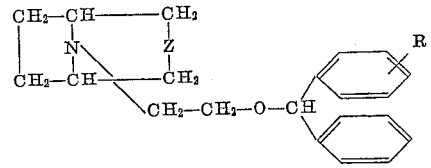

wherein R is selected from the class consisting of hydrogen atoms, halogen atoms, alkyl and alkoxy groups each containing 1–6 carbon atoms and a trihalogenomethyl group and Z is selected from the class consisting of carbonyl, hydroxyiminomethylene, hydroxymethylene, lower alkanoyloxymethylene, benzhydryloxymethylene and p-chlorobenzhydryloxymethylene.

2. N-(2'-benzhydryloxy-ethyl)-nortropane-3-one.
3. N - (2' - benzhydryloxy-ethyl)-nortropane - 3 - one-oxime.
4. N-(2'-benzhydryloxy-ethyl)-nortropine.
5. N-(2'-benzhydryloxy-ethyl)-3α-acetoxy-nortropane.
6. N-(2' - p - chloro-benzhydryloxy-ethyl)-nortropane-3-one.
7. N-(2' - p - chloro-benzhydryloxy-ethyl)-nortropane-3-one-oxime.
8. N-(2'-p-chloro-benzhydryloxy-ethyl)-nortropine.
9. N-(2'-p-chloro-benzhydryloxy-ethyl) - 3α - acetoxy-nortropane.
10. N-(2'-p-methyl-benzhydryloxy-ethyl)-nortropine.
11. N-(2'-p-bromo-benzhydryloxy-ethyl)-nortropine.
12. N-(2'-o-chloro-benzhydryloxy-ethyl)-nortropine.
13. N-(2'-p-methoxy-benzhydryloxy-ethyl)-nortropine.
14. N-(2'-p-trifluoromethyl - benzhydryl - oxy - ethyl)-nortropine.
15. N-(2' - p - chloro-benzhydryloxy-ethyl)-norpseudotropine.

No references cited.